(12) United States Patent
Smith

(10) Patent No.: US 7,484,182 B1
(45) Date of Patent: Jan. 27, 2009

(54) RENDITION-BASED GRAPHICAL LAYOUT MANAGEMENT

(75) Inventor: Albert Gordon Smith, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 478 days.

(21) Appl. No.: 11/172,422

(22) Filed: Jun. 30, 2005

(51) Int. Cl.
*G06F 13/00* (2006.01)
*G06F 15/00* (2006.01)

(52) U.S. Cl. ........................ 715/794; 715/815

(58) Field of Classification Search ................ 715/517, 715/522, 523, 788, 801, 815, 816
See application file for complete search history.

(56) References Cited

U.S. PATENT DOCUMENTS 5,561,757 A * 10/1996 Southgate ................ 715/790
6,310,631 B1 * 10/2001 Cecco et al. .............. 715/792
2002/0191028 A1 * 12/2002 Senechalle et al. ......... 345/800
2006/0271869 A1 * 11/2006 Thanu et al. ............... 715/764

* cited by examiner

*Primary Examiner*—Cao (Kevin) Nguyen
(74) *Attorney, Agent, or Firm*—Fulbright & Jaworski, L.L.P.

(57) ABSTRACT

Systems and methods which implement rendition-based graphical layout management techniques are shown. According to an embodiment, desired resizing of items within a program's user interface is managed through a developer graphically describing a plurality of different sized renditions of a desired user interface and other different sized renditions of the user interface being dynamically interpolated and/or extrapolated through operation of the program. According to embodiments, linear interpolation and/or extrapolation is provided with respect to windows sized differently than constraint images provided by a developer. In embodiments where more than 2 constraint images are provided, piece-wise liner interpolation and/or extrapolation may be provided. Non-linear interpolation and/or extrapolation may be implemented according to embodiments of the invention.

33 Claims, 3 Drawing Sheets

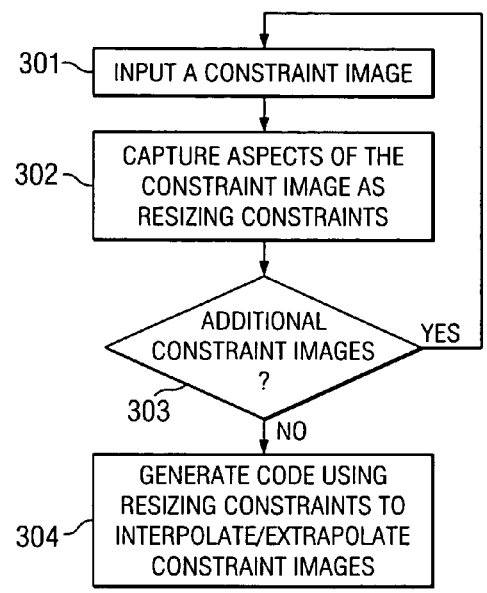
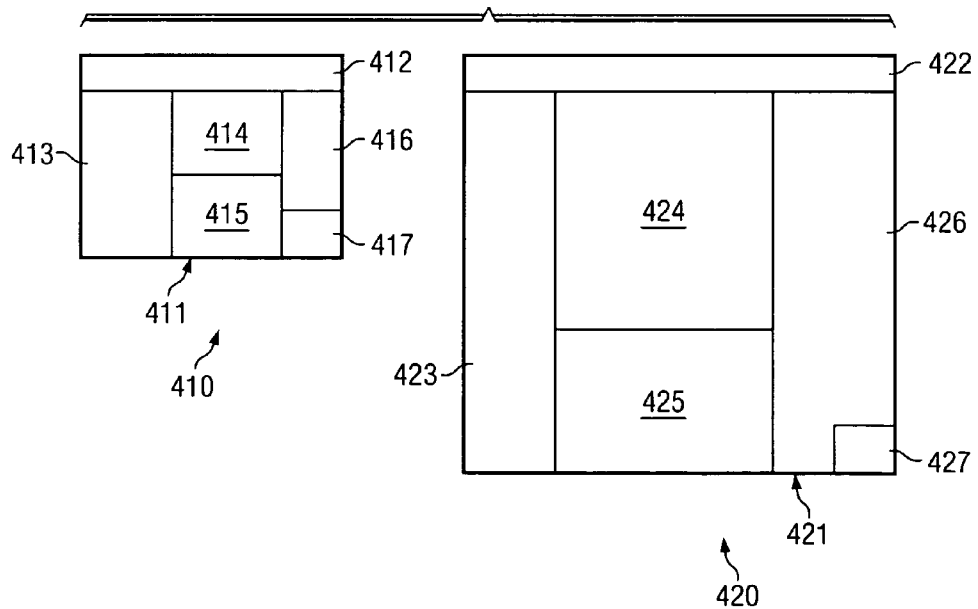

RENDITION-BASED GRAPHICAL LAYOUT MANAGEMENT

TECHNICAL FIELD

The present invention relates generally to computer program layout and, more particularly, to user interface layout using rendition-based graphical layout management.

BACKGROUND OF THE INVENTION

Computer program development, such as development of web based applications, WINDOWS based applications, et cetera, often requires the talents of several specialized individuals. For example, one or more designers (e.g., a visual designer and an interaction designer) may be utilized to provide layout of an application program's user interface in order to provide a visually pleasing, ergonomically designed, intuitive, and/or efficient user interface. The designer may determine where control buttons, list boxes, trees, and other display objects are placed in a program's user interface. A programmer may be utilized to produce the code which will implement the designer's layout as well as the underlying program functionality.

Each of the foregoing program developers brings special talents to the program development process. For example, the designer's education and experience is typically more directed to the arts and less to the sciences, giving this individual unique talents in developing program "eye wash," although perhaps being limited in programming and complex mathematical skills. The programmer, on the other hand, typically possesses education and experience more directed to the sciences than to the arts, giving this individual unique talents in developing efficient and stable programming code, although perhaps being limited in ability with respect to presenting visually pleasing, ergonomically designed, and/or intuitive user interfaces.

Various development tools have been designed in an attempt to simplify program development, and even to reduce the need for particular specialized talents. For example, graphical development tools, such as FLEX BUILDER available from Macromedia, Inc., have been developed to assist in developing programming code from "drag and drop" object placement within the development environment. Such development tools provide substantial improvement over previous development environments. However, various aspects of program development continue to require specialized talents, or are otherwise less simple to develop various program aspects than may be desirable.

Object sizing and placement when a program user interface window is resized is an example of one program aspect which is often problematic in program development. Directing attention to FIG. 1A, window of a program, such as an electronic mail client, is shown as window 100. Window 100 includes a plurality of panes, shown here as menu bar 110, such as may contain various pull down menus and selectable buttons, box 120, such as may contain various folders (perhaps in a tree structure) and/or selectable list items, and panels 130 and 140, such as may contain various selectable mail object items (e.g., a list of e-mail headers in panel 130 and the contents of a selected e-mail message in panel 140). Window 100 of FIG. 1A is displayed having a particular 2-dimensional size (e.g., 300 pixels wide by 200 pixels tall). The particular size of window 100 in FIG. 1A may be insufficient to display all items associated with the menus, boxes, and/or panels thereof. For example, a number of pull down menu items may not be visible upon menu bar 110 due to its size within window 100 being too small. Similarly, a number of list or tree items associated with box 120 may not be visible and a number of mail items may not be visible within panels 130 and 140 due to their size within window 100. Accordingly, it may be desirable to allow a user to resize window 100 in order to allow desired items associated with the panes thereof to be visible. However, accommodating resizing of windows presents a number of challenges with respect to developing programs that may not be sufficiently addressed without the special talents of individuals involved in the program's development.

FIG. 1B shows window 100 having been resized (e.g., 800 pixels wide by 400 pixels tall). Window 100 of FIG. 1B has been resized in both dimensions, although not equally. It can be seen that the resizing of window 100 from FIG. 1A to FIG. 1B has not affected each of the panes therein equally. For example, although not getting taller, menu 110 has been made wider; although not getting wider, box 120 has been made taller; and panels 130 and 140 have been made both taller and wider. Accordingly, each of the panes may have different behavior, e.g., whether they stretch horizontally or vertically and how they divide space among themselves, in a resizing operation. Describing how each of these items of window 100, even ignoring issues with respect to resizing objects within these items, are to be treated in a resizing operation is complicated for a sophisticated developer and may be beyond the skill level of some designers.

Although it is possible to prohibit the resizing of windows, such as is often done with respect to certain dialog boxes, such a prohibition is typically not an acceptable solution when developing robust applications having a flexible user interface. Accordingly, various techniques have been employed to simplify defining how items within a window are to be treated when the window is resized.

One such technique is to write code, such as a resize handler, to directly address the appearance of panes when a window is resized. For example, panes may be hard coded to add a same number of pixels to their width and/or height as are added to a window during resizing. Such a solution is very code oriented, not very declarative, and not very graphical. Accordingly, certain individuals, such as designers, may not readily adopt such a solution.

Another technique for facilitating resizing of windows has been to define a hierarchy of boxes in which the various items of a window are placed and describing how the various boxes are to be resized. For example, a first level in the hierarchy may be defined to include a first vertical box designated as including menu 110 and a second vertical box designated as including everything else within window 100 (box 120 and panels 130 and 140). The first vertical box may be defined as fixed height, but variable width, thus causing menu 110 grow in width, although remaining fixed in height, as window 100 is resized. The second vertical box may be defined as variable height and width, thus allowing this box to fill the remaining areas of window 100 when resized. A second level in the hierarchy may be defined to include a first horizontal box designated as including box 120 and a second horizontal box designated as including everything else within the second vertical box of the first hierarchical level (panels 130 and 140). The first horizontal box may be defined as fixed width, but variable height, thus causing box 120 to grow in height, although remaining fixed in width, as window 100 is resized. The second horizontal box may be defined as variable height and width, thus allowing this box to fill the remaining areas of window 100 when resized. A third level in the hierarchy may be defined to include a first vertical box designated as including panel 130 and a second vertical box designated as including panel 140. Theses vertical boxes may be defined as variable in height and width, thus causing panels 130 and 140 to grow in height and in width as window 100 is resized. However, in order to determine how these two panels are to be resized within the remaining portions of resized window 100, the vertical boxes of the third hierarchy may be provided with relative sizing information. For example, each of the vertical boxes of the third hierarchical level may be resized to fill 50% of the resized area.

It can be seen that, although providing a simplified technique for defining how items are to be resized, the technique requires an understanding of its hierarchical nature and various relationships between the items within the window. Particular individuals, particularly those which are visually oriented, have difficulty conceptualizing such a hierarchy and typically do not think in relative sizes. Accordingly, the foregoing solution may not present an optimal solution for layout of a user interface by many individuals.

BRIEF SUMMARY OF THE INVENTION

The present invention is directed to systems and methods which implement rendition-based graphical layout management techniques. According to an embodiment of the invention, desired resizing of items within a program's user interface is managed through a developer graphically describing a plurality of different sized renditions of a desired user interface and other different sized renditions of the user interface being dynamically interpolated and/or extrapolated through operation of the program.

For example, a designer may utilize a graphical development environment to layout the items, such as control buttons, list boxes, trees, images, and other display objects, within a graphical image or other rendition (first constraint image) of a program's user interface window, wherein the window is of a first (e.g., small) size. Thereafter, the designer may utilize the graphical development environment to layout the items within a graphical image or other rendition (second constraint image) of the program's user interface window of a different size (e.g., larger). The graphical layouts defined by the designer preferably establish constraints with respect to the resizing of the items within the user interface window, not only at the points specifically defined by the designer but also at points between and/or beyond the expressly defined points. Operation of embodiments of the present invention provides interpolation between graphical layouts defined by the designer to dynamically generate user interface windows sized between the graphical images provided by the designer. Additionally or alternatively, embodiments of the invention provide extrapolation for sizes beyond those of the graphical layouts defined by the designer to dynamically generate user interface windows sized larger and/or smaller than the graphical images provided by the designer. Accordingly, the designer may visually create the user interface layout to create a desired appearance throughout a range of window sizes without the need to delve into relative sizes, proportions, or hierarchies of the various items in the window.

Embodiments of the invention may provide the above described interpolation and/or extrapolation using as few as 2 constraint images. However, embodiments of the present invention utilize additional constraint images, such as to establish a point at which one or more item within the user interface begins to behave differently (e.g., ceases to stretch in one or more direction, stretches at a slower or faster rate in one or more direction, et cetera) and/or to establish a point at which the user interface otherwise appears different (e.g., an item is added or removed, placement of one or more items is changed, et cetera).

According to embodiments of the present invention, linear interpolation and/or extrapolation is provided with respect to windows sized differently than constraint images provided by a developer. In embodiments where more than 2 constraint images are provided, piece-wise liner interpolation and/or extrapolation may be provided, for example. However, non-linear interpolation and/or extrapolation may be implemented according to embodiments of the invention. For example, a quadratic curve or other curve may be employed with respect to interpolating and/or extrapolating the layout of windows sized differently than constraint images provided by a developer.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 3 shows a flow diagram of operation of the system of FIG. 2 according to an embodiment of the invention; and FIGS. 4 and 5 show constraint images as may be provided to the system of FIG. 2 according to an embodiment of the invention.

DETAILED DESCRIPTION OF THE INVENTION

Figure 1A:
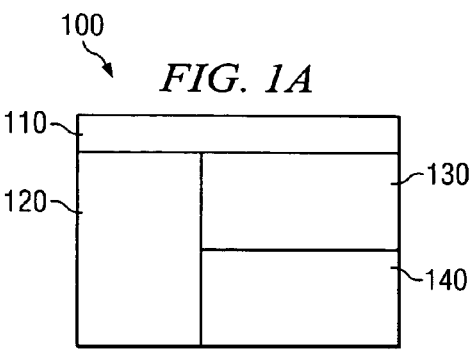
FIG. 1A shows an exemplary user interface window having a first user selected size.
Figure 1B:
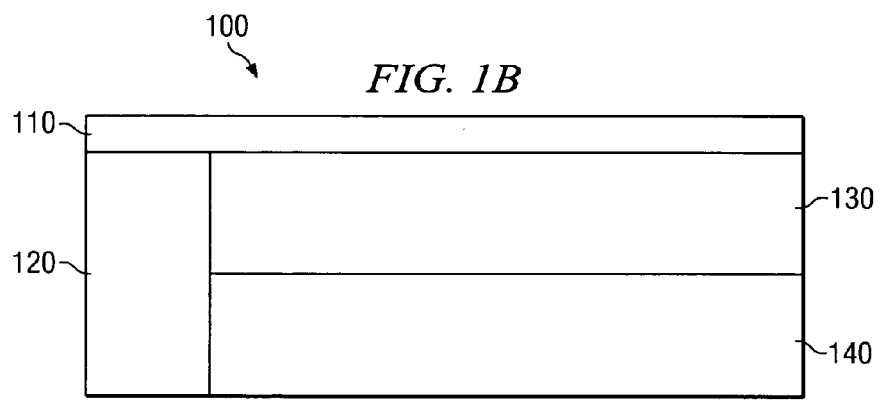
FIG. 1B shows the user interface window of FIG. 1A having a second user selected size.
Figure 2:
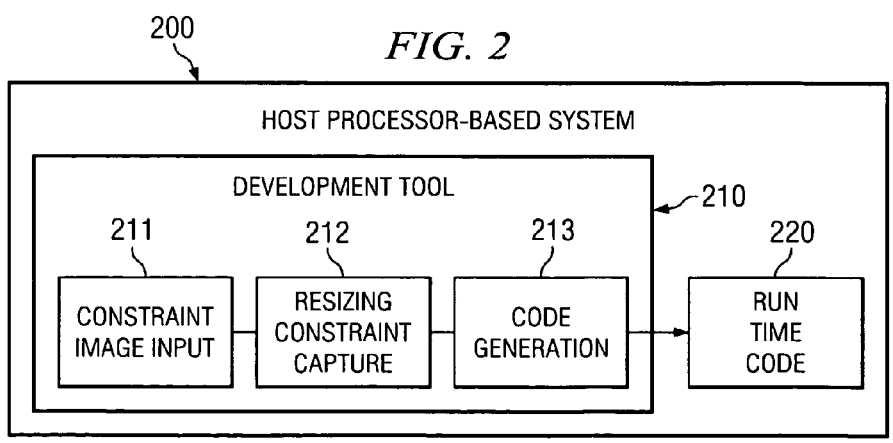
FIG. 2 shows a system adapted according to an embodiment of the present invention.

Directing attention to FIG. 2, a system adapted to provide rendition-based graphical layout management according to an embodiment of the present invention is shown. The embodiment illustrated in FIG. 2 includes development tool 210, such as may comprise an instruction set operable upon host processor-based system 200 to define operation as described herein, providing a graphical development environment useful in developing computer programs. Accordingly, when implemented in software, elements of the present invention are essentially the code segments to perform the described tasks. The program or code segments can be stored in a computer readable medium or transmitted by a computer data signal embodied in a carrier wave, or a signal modulated by a carrier, over a transmission medium. The "computer readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, et cetera.

An example of a development tool that may be adapted to embody the concepts of the present invention to provide development tool 210 is FLEX BUILDER, available from Macromedia, Inc. Example embodiments of host processor-based system 200 include computer systems operable upon the Intel PENTIUM family of processors, computer systems operable upon the Motorola POWERPC family of processors, and computer systems operable upon the Hewlett Packard PA-85XX family of processors. However, the present invention is not restricted by the architecture of host processor-based system 200 as long as host processor-based system 200 supports the inventive operations as described herein.

Development tool 210 of FIG. 2 includes various modules cooperating to provide rendition-based graphical layout management. Specifically, development tool 210 of the illustrated embodiment includes constraint image input 211, resizing constraint capture 212, and code generation 213. Functionality of the foregoing modules facilitates a developer visually creating a user interface layout to create a desired appearance throughout a range of window sizes without the developer determining relative sizes, proportions, or hierarchies of the various items in the window. Accordingly, developers with limited programming skills, such as graphic designers, are empowered to develop programs having robust user interfaces.

FIG. 3 shows a high level flow diagram of operation of development tool 210 in providing rendition-based graphical layout management according to an embodiment of the invention. At block 301, a developer utilizes constraint image input 211 of development tool 210 to layout items, such as control buttons, list boxes, trees, images, and other display objects, as a first constraint image. The first constraint image of this embodiment comprises a graphical representation or rendition of a program's user interface window as that window is to look when sized to a first size.

An example of the first constraint image is illustrated as constraint image 410 of FIG. 4. Constraint image 410 includes a plurality of panes disposed in window 411. Specifically, constraint image 410 includes panes 412-417, such as may comprise control buttons, list boxes, trees, images, et cetera. It may be desired that any or all of panes 412-417 are resized as window 411 is resized. However, one or more of panes 412-417 may be resized differently, e.g., some panes being resized along 2 axes while other panes are resized only a single axis, thus resulting in complexity in providing program coding to describe the desired effects of resizing window 411. Accordingly, development tool 210 of the illustrated embodiment operates to allow a developer to graphically define a plurality of constraint images, associated with variously sized windows to provide "programming by example."

At block 302 resizing constraint capture 212 captures aspects of constraint image 410 as resizing constraints. For example, resizing constraint capture 212 may capture position information with respect to each panel of panels 412-417. Such position information may comprise absolute position information for panels, such as X, Y coordinates of the upper left corner and X, Y coordinates of the lower right corner, relative position information, such as off set from reference points (e.g., a window datum, such as the upper left corner, or another panel), and/or combinations thereof (e.g., X, Y coordinates of a corner of the pane and lengths of sides of the pane). Resizing constraint capture 212 may additionally or alternatively capture proportion information, such as a percentage of window 411 occupied by one or more panes, relative sizes (e.g., length, width, and/or surface) of various panes. The resizing constraints captured from constraint image 410 by resizing constraint capture 212 are preferably used by code generation 213 in generating run time code adapted to provide dynamic resizing of user interface windows as described below.

At block 303, a determination is made as to whether additional constraint images are to be provided. For example, where a single constraint image has been input for a particular user interface window, a second, differently sized, constraint image may be input in order to facilitate resizing interpolation and/or extrapolation according to embodiments of the invention. Additionally, where a plurality of constraint images have been input for a particular user interface window, one or more additional, differently sized and/or configured, constraint images may be input in order to facilitate piece-wise interpolation and/or extrapolation according to embodiments of the invention.

Embodiments of the invention may operate to control resizing of user interface windows using a single constraint image. For example, if a single constraint image is provided for a particular user interface window, without a second constraint image being provided, an embodiment of the invention may operate to provide a fixed size (non-resizable) user interface window. Alternatively, default resizing parameters may be utilized, such as to control certain aspects of items (e.g., retain the height of a menu bar, the width of a pull down menu, et cetera) while allowing resizing of a user interface window to otherwise adjust the items therein proportionately.

If, at block 303, it is determined that additional constraint images are to be input, processing according to the embodiment of FIG. 3 returns to block 301. At block 301, the developer utilizes constraint image input 211 of development tool 210 to layout the items as a second constraint image. The second constraint image of this embodiment comprises a graphical representation or rendition of a program's user interface window as that window is to look when resized from the above first size to a second size.

An example of the second constraint image is illustrated as constraint image 420 of FIG. 4. Constraint image 420 again includes a plurality of panes disposed in a window, here window 421. Specifically, constraint image 420 includes panes 422-427 corresponding to panes 412-417 of constraint image 410. Correspondence between panes of various constraint images may be determined using logic to identify relationships between the various constraint image renditions, perhaps providing prompts to query a developer with respect to one or more correspondences (e.g., where a pane has been deleted with respect to one constraint image). A preferred embodiment utilizes unique identification strings with respect to various items, such as the aforementioned panes, useful in determining correspondence between constraint image renditions. For example, a menubar pane for one constraint image might include id="menubar", along with additional information such as starting position, width, height, et cetera, and another constraint image including this menubar pane might again include id="menubar", along with some or all of the additional information being changed. Such unique identification strings are particularly useful where substantially different layouts are used with respect to a series of constrain image renditions.

Window 421 has been resized (here along both the X and Y axes) as related to window 411 and panes of panes 422-427 have been resized as related to corresponding ones of panes 412-417. It should be appreciated that various ones of the panes have been resized differently. For example, pane 422 has been resized only along the X axis, pane 423 has been resized only along the Y axis, panes 424-426 have been resized along both the X and Y axes, and the size of pane 427 has not been changed. Moreover, the proportions of panes 424 and 425 with respect to each other have been changed as compared to the proportions of corresponding panes 414 and 415. Accordingly, although a developer may have had difficulty in mathematically describing how each pane was to be defined upon resizing of the window, the developer has been able to employ development tool 210 of the illustrated embodiment to graphically define an example of a desired resized window.

After input of the second constraint image, processing according to the illustrated embodiment again proceeds to block 302. At block 302 resizing constraint capture 212 captures aspects of constraint image 420 as resizing constraints as discussed above with respect to constraint image 410. The resizing constraints captured from constraint image 420 are preferably used by code generation 213 with the resizing constraints captured from constraint image 410 in generating run time code adapted to provide dynamic resizing of user interface windows as described below.

At block 303, a determination is again made as to whether additional constraint images are to be provided. Assuming that additional constraint images are not to be provided, processing according to the embodiment of FIG. 3 proceeds to block 304.

At block 304 code generation 213 of the exemplary embodiment utilizes resizing constraints provided by resizing constraint capture 212 to generate runtime code 220 adapted to dynamically provide user interface window resizing consistent with constraint images 410 and 420. Runtime code 220 may comprise extensible markup language (XML) code and/or programmatic scripts operable with respect to a web-based program, such as a FLASH program well known in the art. Additionally or alternatively, runtime code 220 may comprise resizing data supporting interpolation and/or extrapolation with respect to user interface window resizing as a function of the resizing constraints.

Using the resizing constraints associated with constraint images 410 and 420, code generation 213 may derive interpolative and/or extrapolative formulas for defining the panes of a user interface window of any size. The foregoing interpolative and/or extrapolative formulas may be linear or non-linear. For example, a developer may select linear interpolation and/or extrapolation in development tool 210. Alternatively, a developer may select a non-linear function, or input a non-linear function, for use in interpolation and/or extrapolation in development tool 210. It should be appreciated that resizing formulas used according to embodiments of the invention need not be "generated" by code generation 213. For example, resizing formulas of the present invention may be compiled normally as part of the runtime code with code generation 213 providing the appropriate constraint data to facilitate resizing operations according to the rendition-based graphical layout management input by the developer.

As an example, assume that window 421 has been resized to be 200% as wide as window 411 and 250% as high as window 411. From windows 411 and 421 it may be determined that pane 422 comprises a horizontal bar anchored to the upper left corner of the window, the shape of which is not changed in height but which changes in width with resizing of the window. Accordingly, an interpolative formula for a corresponding pane to be generated in a user interface window may provide a starting datum point, such as the upper left hand corner of the window, a height value, such as 20 pixels, and a width formula of (window width)*100%. Where a window which is 150% as wide as window 411 and 187.5% as high as window 411 is desired, the foregoing formula may be utilized to determine that a pane corresponding to panes 412 and 422 is to begin in the upper left corner of the window, extend 20 pixels in height, and extend 150% of the width of pane 412.

Although the foregoing example has been kept simple in order to aid in understanding the concepts of the present invention, it can readily be appreciated that more complex interpolative and/or extrapolative formulas may be derived from the resizing constraints of constraint images 410 and 420. Such formulas may include various datums, such as other points of the window, points of other panes, et cetera, various fixed values, such as absolute positions, lengths in different units, et cetera, and various proportions, such as proportions of the window, proportions of portions of the window, proportions relative to other panes, et cetera.

It should be appreciated that interpolation and/or extrapolation provided according to embodiments of the present invention can be applied to widows resized in ways not completely corresponding to the resizing between constraint image windows 411 and 421. For example, the foregoing interpolative and/or extrapolative formulas are applicable not only when a window is resized along both the X and Y axes proportionately to constraint image windows 411 and 421, but also when resized along an axis non-proportionately to constraint image windows 411 and 421. For example, when a window is resized along one axis only, the foregoing interpolative and/or extrapolative formulas remain valid to provide interpolation and/or extrapolation with respect to the axis of change. Similarly, when a window is resized to stretch the window along one axis and to shrink the window along another axis, the foregoing interpolative and/or extrapolative formulas remain valid to provide interpolation and/or extrapolation with respect to each axis.

Although an exemplary embodiment has been described above with respect to inputting a first and second constraint image, it should be appreciated that constraint images may be provided in a variety of ways according to embodiments of the invention. For example, a developer may drag and drop various items to define a first constraint image, thereafter selecting a "capture" control of development tool 210 to capture resizing constraints. The developer may then alter the constraint image, such as to stretch, shrink, move, add, delete, et cetera various items to define a second constraint image, thereafter selecting the "capture" control of development tool 210 to capture additional resizing constraints. Accordingly, the developer may input a single constraint image and alter that image to graphically describe a plurality of different sized renditions of a desired user interface. Additionally or alternatively, rather than creating a constraint image, a developer may input a suitable image, such as may have been developed using a different graphical tool or as may have been captured using an imaging device, to provide a constraint image.

Although the above example embodiment has been described with reference to 2 constraint images, embodiments of the present invention may utilize any number of constraint images suitable for graphically representing desired window resizing. For example, 3 or more constraint images may be utilized to provide piece-wise linear resizing of one or more panes of a resized window.

Figure 5:
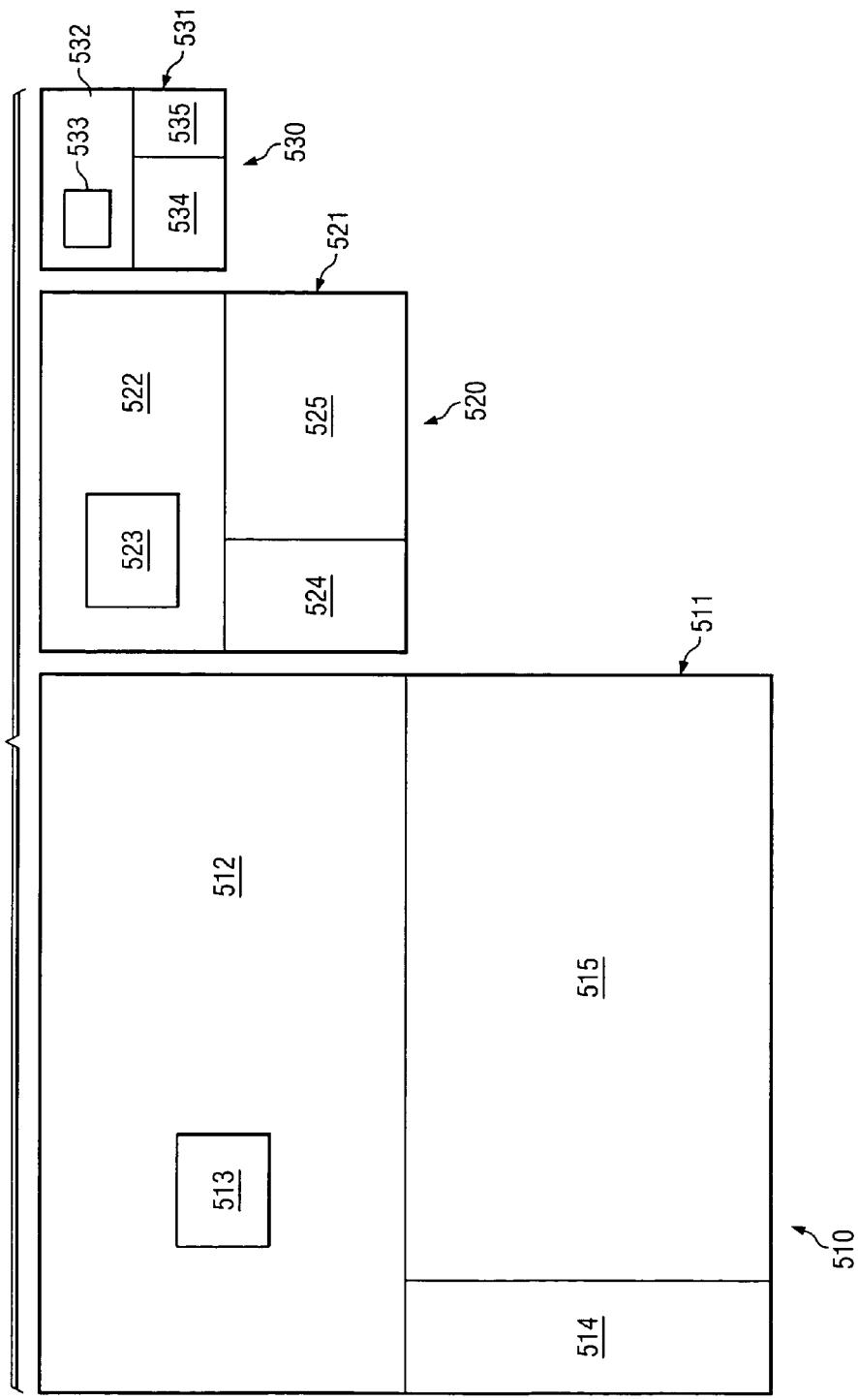

FIG. 5 shows an embodiment wherein at least 3 constraint images are utilized. A first constraint image is illustrated as constraint image 510 of FIG. 4. Constraint image 510 includes a plurality of panes disposed in window 511. Specifically, constraint image 510 includes panes 512-515, such as may comprise control buttons, list boxes, trees, images, et cetera. It may be desired that any or all of panes 512-515 are resized as window 511 is resized. However, one or more of panes 512-515 may be resized differently, e.g., some panes being resized along 2 axes while other panes are resized only a single axis, thus resulting in complexity in providing program coding to describe the desired effects of resizing window 511. Moreover, resizing with respect to one or more of panes 512-515 may behave differently at various times, such as depending upon the size of the window (e.g., area, width, or height). Accordingly, development tool 210 of the illustrated embodiment operates to allow a developer to graphically define a plurality of constraint images, associated with variously sized windows to provide "programming by example" which not only illustrates changes to the panes, but also illustrates a pane behaving differently at one or more points during resizing.

The second constraint image of FIG. 5, illustrated as constraint image 520, again includes a plurality of panes disposed in a window, here window 521. Specifically, constraint image 520 includes panes 522-525 corresponding to panes 512-515 of constraint image 510. However, window 521 has been resized (here along both the X and Y axes, although different amounts along each such axis) as related to window 511 and panes of panes 522-525 have been resized as related to corresponding ones of panes 512-515. It should be appreciated that various ones of the panes have been resized differently. For example, pane 524 has been resized only along the Y axis, panes 522 and 525 have been resized along both the X and Y axes, and the size of pane 523 has not been changed. Moreover, the proportions of panes 422 and 525 with respect to each other have been changed as compared to the proportions of corresponding panes 512 and 515.

The third constraint image of FIG. 5, illustrated as constraint image 530, also includes a plurality of panes disposed in a window, here window 531. Specifically, constraint image 530 includes panes 532-535 corresponding to panes 512-515 of constraint image 510 and panes 522-525 of constraint image 520. However, window 531 has been resized (here along both the X and Y axes, although different amounts along each such axis) as related to window 521 and panes of panes 532-535 have been resized as related to corresponding ones of panes 522-525. It should be appreciated that the resizing behavior of various ones of the panes is different between constraint images 520 and 530 as compared to the resizing behavior of various ones of the panes between constraint images 510 and 520. For example, although the size of pane 523 remained unchanged in constraint image 520 as compared to pane 513 in constraint image 510, pane 533 has been resized in constraint image 530 as compared to pane 523 in constraint image 520. Accordingly, constraint image 520 of the illustrated embodiment establishes a resizing behavior transition point with respect to a user interface pane corresponding to panes 513, 523, and 533.

It should be appreciated that, although the illustrated embodiment illustrates a single resizing behavior transition point, multiple such resizing behavior transition points may be defined. For example, a plurality of constraint images may be provided between constraint images 510 and 520 and/or between constraint images 520 and 530 to establish resizing behavior transition points associated with one or more panes.

In operation according to embodiments of the invention, interpolation and/or extrapolation may result in features of dynamically generated user interface windows, such as panel edges, being disposed at fractional pixel values which may result in undesirable artifacts. For example, a dynamically generated user interface window of a particular size may result in an edge of a panel falling between 2 pixels, thereby using 2 adjacent grey pixels to generate an edge line rather than 1 black pixel. Generating an edge in such a way may provide an panel edge boundary which is less well defined or is otherwise visually undesired. Accordingly, embodiments of the invention may operate to analyze dynamically generated user interface windows for particular artifacts, such as fractional pixel values, and to modify the dynamically generated user interface to remediate some or all such artifacts. For example, fractional pixel values may be addressed by slightly altering the position of some or all of an associated panel to result in integer pixel value placement. Such altered positions are preferably analyzed to remediate visual impact of the altered placement. For example, if a particular panel's position is altered to remediate an artifact, such as a fractional pixel value, spacing between various corresponding panels may be altered. Accordingly, other ones of the panels may be altered in position to provide a resulting dynamically generated user interface window appearing to have consistent, or otherwise desirable, spacing.

Embodiments of the invention may operate to provide window resizing sampling based upon constraint images. For example, after having input a first and second constraint window, development tool 210 may allow a developer to view windows having panels therein resized using the above mentioned interpolative and/or extrapolative formulas. For example, the developer may select a window size, such as by dragging a rectangle of a desired size, and development tool 210 may present an interpolated or extrapolated rendition of the user interface window. Additionally or alternatively, development tool 210 may provide a series of resized windows for viewing by a developer. For example, development tool 210 may generate a series of interpolated renditions of the user interface window sized between a first constraint window and a second constraint window. Such previewing of user interface windows may be particularly useful for a developer to determine if the layout is likely to result in the aforementioned artifacts or otherwise does not produce visually desirable results.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    inputting a first constraint image graphically establishing size information of a plurality of user interface window items with respect to a first window size;
    inputting a second constraint image graphically establishing size information of said plurality of user interface window items with respect to a second window size;
    deriving program code for dynamically generating a user interface window of a third size, wherein said program code comprises interpolative formulas for sizing said plurality of user interface window items for user interface windows of various sizes between said first window size and said second window size; and
        generating said user interface window of said third size and having said plurality of user interface window items disposed therein, wherein a size of each of said plurality of user interface window items is determined as a function of said size information of said first and second constraint images.

2. The method of claim 1, wherein said plurality of user interface window items comprise panes.

3. The method of claim 1, wherein said generating said user interface window of said third size is accomplished in runtime of a computer program in response to a user resizing said user interface window.

4. The method of claim 1, further comprising:
    inputting a third constraint image graphically establishing size information of said plurality of user interface window items with respect to a fourth window size.

5. The method of claim 4, wherein said third constraint image establishes a resizing behavior transition point with respect to at least one user interface window item of said plurality of user interface window items.

6. The method of claim 4, wherein a size of each of said plurality of user interface window items generated by said generating a user interface window of said third size is further determined as a function of said size information of said third constraint image.

7. The method of claim 1 wherein said inputting said first constraint image and said inputting said second constraint image comprises:
    inputting said first constraint image and inputting said second constraint image to a development tool in which a software application is being authored.

8. The method of claim 7 wherein said generating comprises:
    generating said user interface window by run-time code of said software application.

9. A method comprising:
    inputting a first constraint image graphically establishing size information of a plurality of user interface window items with respect to a first window size;
    inputting a second constraint image graphically establishing size information of said plurality of user interface window items with respect to a second window size;
    wherein said inputting said first and second constraint images comprises:
    inputting said first and second constraint images to a development tool in which a software application is being authored; and
    deriving program code for dynamically generating a user interface windows of various sizes different than said first window size and said second window size and having said plurality of user interface window items disposed therein, wherein a size of each of said plurality of user interface window items within said dynamically generated user interface windows is determined as a function of said size information of said first and second constraint images.

10. The method of claim 9, further comprising:
    generating a user interface window of a third size and having said plurality of user interface window items disposed therein using said derived program code.

11. The method of claim 10, wherein said generating said user interface window of said third size comprises interpolating sizing information between said first constraint image and said second constraint image.

12. The method of claim 10, wherein said generating said user interface window of said third size comprises extrapolating sizing information outside of said first and second constraint images.

13. The method of claim 10, wherein said generating said user interface window of said third size is accomplished in runtime of a computer program in response to a user resizing said user interface window.

14. The method of claim 9, wherein said plurality of user interface window items comprise panes.

15. The method of claim 9, further comprising:
    inputting a third constraint image graphically establishing size information of said plurality of user interface window items with respect to a third window size.

16. The method of claim 15, wherein said third constraint image establishes a resizing behavior transition point with respect to at least one user interface window item of said plurality of user interface window items.

17. The method of claim 9 wherein said deriving comprises:
    deriving, by said development tool, said program code in said software application for dynamically generating, during run-time of said software application, said user interface windows of various sizes.

18. A system comprising:
    a constraint image input module accepting graphical images representing a desired layout of a user interface in at least two different sizes;
    a resizing constraint capture module capturing resizing constraints from one or more constraint images accepted by said constraint image input module; and
    a code generation module generating code including a resizing algorithm derived from said resizing constraints, said resizing algorithm controlling resizing of said layout of said user interface consistent with said one or more constraint images, and wherein said resizing algorithm is operable to control resizing of said layout of said user interface using extrapolation of resizing constraints of a plurality of constraint images.

19. The system of claim 18, further comprising:
    a development tool, said development tool including said resizing constraint capture module and said code generation module.

20. The system of claim 19, wherein said development tool further includes said constraint image input module.

21. A method comprising:
    inputting, to a development tool in which source code of a software application is being authored, a first constraint image graphically establishing, with respect to a first window size, size information of a plurality of user interface window items that are contained in a user interface window of said software application being authored;

inputting, to said development tool, a second constraint image graphically establishing, with respect to a second window size, size information of said plurality of user interface window items that are contained in said user interface window of said software application being authored; and generating, by said development tool, source code for said software application that defines a resizing algorithm derived from said first and second constraint images, said resizing algorithm controlling, during run-time of said software application, resizing of said user interface window items responsive to resizing of said user interface window of said software application.

22. The method of claim 21 further comprising:

generating, by run-time execution of said software application, said user interface window having a third size and having said plurality of user interface window items disposed therein, wherein a size of each of said plurality of user interface window items is determined as a function of said resizing algorithm.

23. A method comprising:

inputting a first constraint image graphically establishing size information of a plurality of user interface window items with respect to a first window size;

inputting a second constraint image graphically establishing size information of said plurality of user interface window items with respect to a second window size;

deriving program code for dynamically generating a user interface window of a third size, wherein said program code comprises extrapolative formulas for sizing said plurality of user interface window items for user interface windows of various sizes between said first window size and said second window size; and generating said user interface window of said third size and having said plurality of user interface window items disposed therein, wherein a size of each of said plurality of user interface window items is determined as a function of said size information of said first and second constraint images.

24. The method of claim 23, wherein said plurality of user interface window items comprise panes.

25. The method of claim 23, wherein said generating said user interface window of said third size is accomplished in runtime of a computer program in response to a user resizing said user interface window.

26. The method of claim 23, further comprising:

inputting a third constraint image graphically establishing size information of said plurality of user interface window items with respect to a fourth window size.

27. The method of claim 26, wherein said third constraint image establishes a resizing behavior transition point with respect to at least one user interface window item of said plurality of user interface window items.

28. The method of claim 26, wherein a size of each of said plurality of user interface window items generated by said generating a user interface window of said third size is further determined as a function of said size information of said third constraint image.

29. The method of claim 23 wherein said inputting said first constraint image and said inputting said second constraint image comprises:

inputting said first constraint image and inputting said second constraint image to a development tool in which a software application is being authored.

30. The method of claim 29 wherein said generating comprises:

generating said user interface window by run-time code of said software application.

31. A system comprising:

a constraint image input module accepting graphical images representing a desired layout of a user interface in at least two different sizes;

a resizing constraint capture module capturing resizing constraints from one or more constraint images accepted by said constraint image input module; and a code generation module generating code including a resizing algorithm derived from said resizing constraints, said resizing algorithm controlling resizing of said layout of said user interface consistent with said one or more constraint images, and wherein said resizing algorithm is operable to control resizing of said layout of said user interface using interpolation of resizing constraints of a plurality of constraint images.

32. The system of claim 31, further comprising:

a development tool, said development tool including said resizing constraint capture module and said code generation module.

33. The system of claim 32, wherein said development tool further includes said constraint image input module.

* * * * *